(12) United States Patent
Tada et al.

(10) Patent No.: US 6,746,319 B2
(45) Date of Patent: Jun. 8, 2004

(54) MEASURING APPARATUS

(75) Inventors: Mitsuo Tada, Tokyo (JP); Yasunari Suto, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/213,109

(22) Filed: Aug. 7, 2002

(65) Prior Publication Data

US 2003/0032377 A1 Feb. 13, 2003

(30) Foreign Application Priority Data

Aug. 10, 2001 (JP) ........................................ 2001-243170

(51) Int. Cl.⁷ .............................................. B24B 49/00
(52) U.S. Cl. .......................................... 451/285; 451/8
(58) Field of Search ................................ 451/285–189, 451/5, 6, 7, 8

(56) References Cited

U.S. PATENT DOCUMENTS

| | | | | |
|---|---|---|---|---|
| 5,025,665 A | * | 6/1991 | Keyes et al. | 73/597 |
| 6,029,521 A | * | 2/2000 | Lin et al. | 73/597 |
| 6,045,434 A | * | 4/2000 | Fisher et al. | 451/6 |
| 6,257,953 B1 | * | 7/2001 | Gitis et al. | 451/5 |
| 6,379,219 B1 | * | 4/2002 | Oba | 451/8 |
| 6,488,569 B1 | * | 12/2002 | Wang et al. | 451/8 |
| 6,494,765 B2 | * | 12/2002 | Gitis et al. | 451/5 |
| 6,524,165 B1 | * | 2/2003 | Wiswesser et al. | 451/6 |
| 6,537,133 B1 | * | 3/2003 | Birang et al. | 451/6 |
| 6,561,868 B1 | * | 5/2003 | Edwards et al. | 451/8 |

FOREIGN PATENT DOCUMENTS

| | | | | |
|---|---|---|---|---|
| JP | 04319626 A | * | 11/1992 | G01H/05/00 |
| JP | 4-319626 | | 11/1992 | |
| JP | 05141928 A | * | 6/1993 | G01B/11/16 |
| JP | 2001-281348 | | 10/2001 | |

* cited by examiner

*Primary Examiner*—Joseph J. Hail, III
*Assistant Examiner*—David B. Thomas
(74) *Attorney, Agent, or Firm*—Wenderoth, Lind & Ponack, L.L.P.

(57) ABSTRACT

A measuring apparatus includes a heating unit for applying heat to a first point within a workpiece or on a surface of a workpiece and propagating the heat to a second point within the workpiece or on the surface of the workpiece. The measuring apparatus further includes a measuring unit for measuring a displacement of the surface of the workpiece at the second point to which the heat has been propagated, and an analyzing unit for analyzing a structure of the workpiece based on the displacement measured by the measuring unit in consideration of a distance between the first point and the second point.

18 Claims, 5 Drawing Sheets

F I G. 5
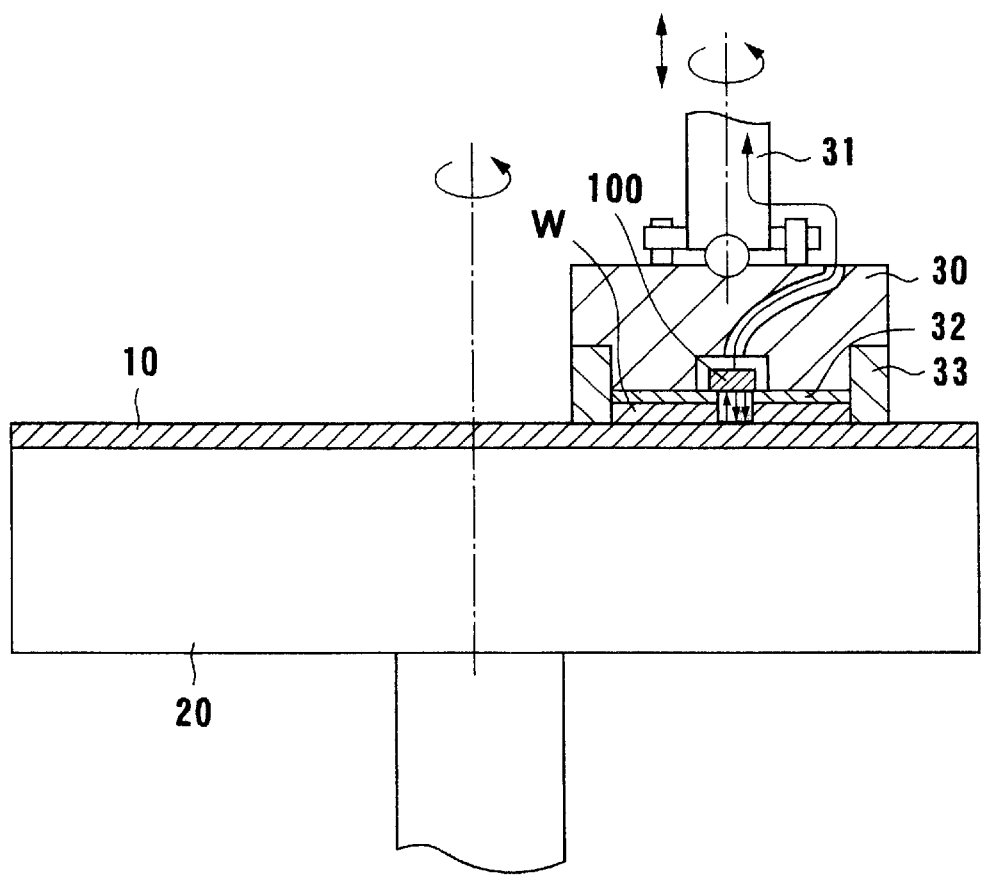

MEASURING APPARATUS

BACKGROUND OF THE INVENTION

1. Field of the Invention

The present invention relates to a measuring apparatus, and more particularly to a measuring apparatus for measuring the thickness of a thin film formed on a surface of a workpiece such as a semiconductor substrate.

2. Description of the Related Art

In recent years, a higher integration of a semiconductor device has required the narrower wiring and the multilayer wiring, and hence it is necessary to make a surface of a semiconductor substrate highly planarized. Specifically, finer interconnections in highly integrated semiconductor devices have led to the use of light with shorter wavelengths in photolithography, so that a tolerable difference of elevation at the focal point on the substrate becomes smaller in the light with shorter wavelengths. Therefore, a difference of elevation at the focal point should be as small as possible, i.e., the surface of the semiconductor substrate is required to be highly planarized. One customary way of planarizing the surface of the semiconductor substrate is to remove irregularities (concaves and convexes) on the surface of the semiconductor substrate by a chemical mechanical polishing (CMP) process.

In the chemical mechanical polishing process, after a surface of a semiconductor substrate has been polished for a certain period of time, the polishing process should be finished at a desired position or timing. For example, some integrated circuit designs require an insulating film (layer) of SiO2 or the like to be left on a metallic interconnection of copper, aluminum, or the like. Since a metallic layer or other layers are further deposited on the insulating layer in the subsequent process, such an insulating layer is referred to as an interlayer. In this case, if the semiconductor substrate is excessively polished, the lower metallic layer is exposed on the polished surface. Therefore, the polishing process needs to be finished in such a state that a predetermined thickness of the interlayer remains unpolished.

According to another polishing process, interconnection grooves having a certain pattern are formed in a surface of a semiconductor substrate, and a cooper (Cu) layer is deposited on the semiconductor substrate to fill the interconnection grooves filled with copper or copper alloy, and then unnecessary portions of the Cu layer are removed by a chemical mechanical polishing (CMP) process. Specifically, the Cu layer on the semiconductor substrate is selectively removed by the chemical mechanical polishing process, leaving only the Cu layer in the interconnection grooves. More Specifically, the Cu layer is required to be removed until an insulating layer of $SiO_2$ or the like is exposed in surfaces other than the interconnection grooves.

In such cases, if the semiconductor substrate is excessively polished until the Cu layer in the interconnection grooves is removed together with the insulating layer, then the resistance of the circuits on the semiconductor substrate would be so increased that the semiconductor substrate might possibly need to be discarded, resulting in a large loss of resources. Conversely, if the semiconductor substrate is insufficiently polished to leave the copper layer on the insulating layer, then interconnections on the semiconductor substrate would not be separated from each other as desired, but a short circuit would be caused between those interconnections. As a result, the semiconductor substrate would be required to be polished again, and hence its manufacturing cost would be increased. The above problems also occur when another metallic film of aluminum or the like is formed on a semiconductor substrate and polished by the CMP process.

Therefore, it has heretofore been proposed to detect an end point of the CMP process with use of a measuring apparatus having an electric current meter, an eddy current sensor, an optical sensor, or the like for measuring the thickness of an insulating film or a metal film formed on a polished surface to detect when the CMP process is to be finished. In a deposition process such as a plating process or a chemical vapor deposition (CVD) process, it has also been proposed to measure the thickness of a thin film deposited on a substrate to detect an end point of the process, as with the CMP process.

As semiconductor devices have been more highly integrated, the measuring apparatus has been required to measure the film thickness with higher accuracy. The need for such a highly accurate measuring apparatus has been increased not only in the field of semiconductor fabrication, but also in other industrial fields.

SUMMARY OF THE INVENTION

The present invention has been made in view of the above drawbacks. It is therefore an object of the present invention to provide a measuring apparatus which can measure the thickness of a film formed on a workpiece such as a semiconductor substrate or the like with high accuracy.

According to a first aspect of the present invention, there is provided a measuring apparatus comprising: a heating unit for applying heat to a first point within a workpiece or on a surface of a workpiece and propagating the heat to a second point within the workpiece or on the surface of the workpiece; a measuring unit for measuring a displacement of the surface of the workpiece at the second point to which the heat has been propagated; and an analyzing unit for analyzing a structure of the workpiece based on the displacement measured by the measuring unit in consideration of a distance between the first point and the second point.

According to a second aspect of the present invention, there is provided a measuring apparatus comprising: a strain applying unit for applying a strain to a first point within a workpiece or on a surface of a workpiece and propagating the strain to a second point within the workpiece or on the surface of the workpiece; a measuring unit for measuring a displacement of the surface of the workpiece at the second point to which the strain has been propagated; and an analyzing unit for analyzing a structure of the workpiece based on the displacement measured by the measuring unit in consideration of a distance between the first point and the second point.

According to a third aspect of the present invention, there is provided a polishing apparatus comprising: a polishing table having a polishing surface; a top ring for holding and pressing a workpiece to be polished against the polishing surface; and the above measuring apparatus for measuring the thickness of a film formed on a surface of the workpiece.

With the above arrangement, the structure of a workpiece can be measured by a novel process which has not heretofore been available. Particularly, the measuring apparatus according to the present invention can measure the thickness of a metal film of W, Al, Ta, Cu, Ti, or the like, a nitride film of TaN, TiN, SiN, or the like, an oxide film of $SiO_2$ or the like, a film of polycrystalline silicon, a BPSG film, or a plasma TEOS oxide film formed on a semiconductor substrate. The measuring apparatus according to the present invention can also detect an end point of any process in various CMP apparatus for polishing substrates having shallow trenches (STI), interlayer insulating films (ILD, IMD), Cu films, W films, or the like, and various plating apparatus and CVD apparatus for depositing such films on the substrates.

The strain applying unit may utilize a sound wave, an ultrasonic wave, or an electromagnetic wave to apply the strain to the first point.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a vertical cross-sectional view showing a polishing apparatus incorporating a measuring apparatus according to another embodiment of the present invention;

DETAILED DESCRIPTION OF THE PREFERRED EMBODIMENTS

First, the principles of a measuring apparatus according to the present invention will be described below with reference to FIG. 1.

Figure 1:
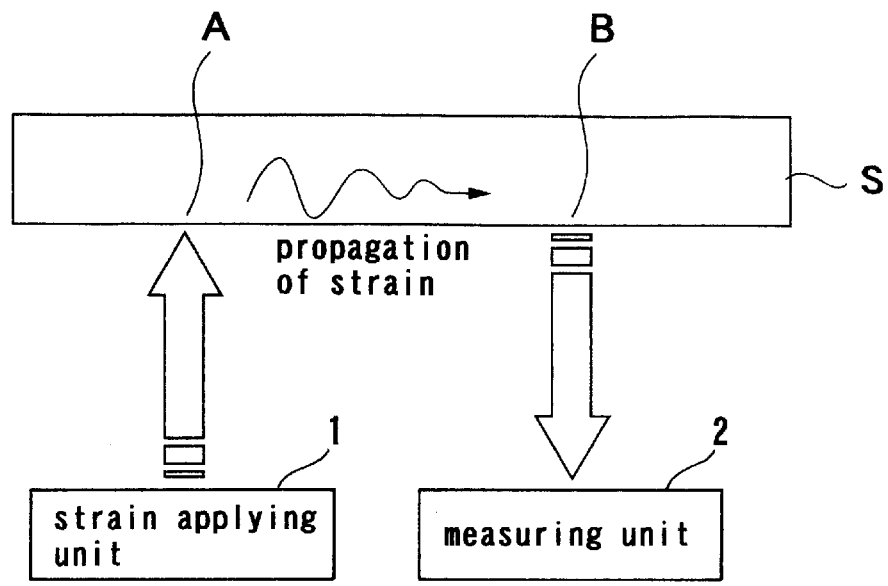
FIG. 1 is a conceptual view explanatory of the principles of a measuring apparatus according to the present invention.

As shown in FIG. 1, when a strain applying unit 1 applies a strain to a point A within a workpiece S or on a surface of the workpiece (substance) S, the strain applied to the point A is propagated around the point A. The strain is propagated in a manner specific to the properties (structure) of the workpiece S. For example, the propagation speed or magnitude of the strain at a portion of the workpiece S that has a thickness different from the thickness of another portion thereof is different from the propagation speed or magnitude of the strain at the other portion. Accordingly, in the case where the strain is propagated from the point A to a point B spaced from the point A, the strain propagated to the point B depends on the structure of the workpiece S from the point A to the point B. If the strain propagated to the point B, i.e., the displacement at the point B, is measured and analyzed with a measuring unit 2, then the structure of the workpiece S from the point A to the point B can be specified based on the analyzed results. The measuring apparatus according to the present invention is designed to determine the structure of a workpiece with use of the propagation of a strain through the workpiece as described above.

Figure 2:
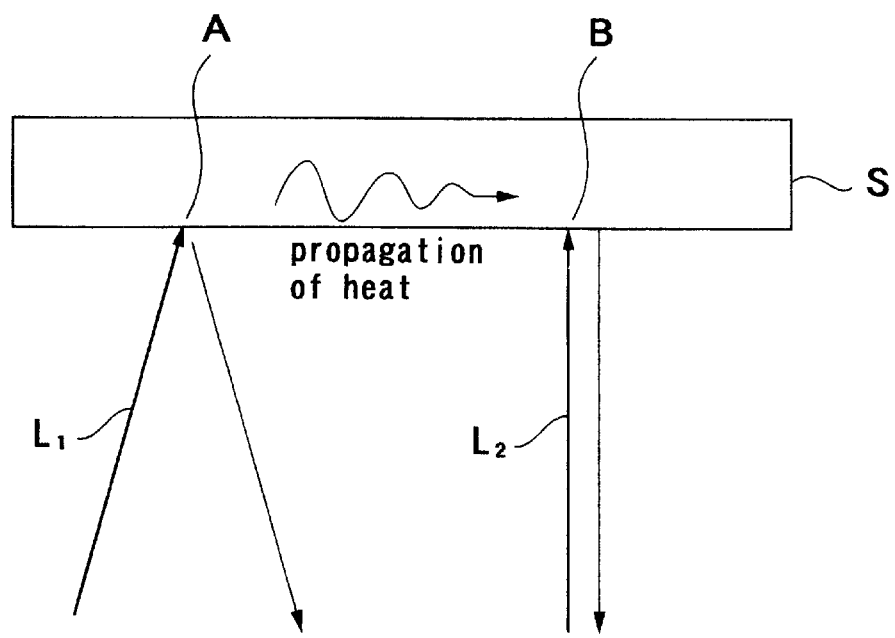
FIG. 2 is a conceptual view explanatory of the principles of a measuring apparatus according to an embodiment of the present invention.

Heat may be used to apply a strain to a point within a workpiece or on a surface of the workpiece. For example, a laser beam $L_1$ is applied to a point A on a workpiece S to locally heat the point A, as shown in FIG. 2. When the point A is heated, the point A is thermally expanded and hence a strain is produced at the point A. This thermal expansion is not in equilibrium and hence causes a thermal diffusion which transfers heat around the point A. As the heat is thus propagated around the point A in the workpiece S, a strain (displacement) is also propagated around the point A in the workpiece S. The propagation speed and magnitude of the stain differ depending on the properties (structure) of the workpiece S. Therefore, the structure of the workpiece S from the point A to a point B spaced therefrom can be specified by measuring and analyzing a displacement propagated to the point B with a laser beam $L_2$ emitted from an optical displacement gauge. If there is a scratch or foreign matter within the workpiece S or on a surface of the workpiece S, then the heat is reflected, refracted, or attenuated by the scratch or foreign matter, thereby causing unusual propagation of heat. Therefore, by analyzing a displacement caused by the propagation of heat, it is also possible to specify the position, size, and structure of a scratch, a defect, an interconnection defect, or foreign matter within the workpiece or on the surface of the workpiece. While the principles of the measuring apparatus according to the present invention have been described above with respect to the thermal expansion, the present invention is also applicable to a volumetric change (strain) of a workpiece due to heat, such as thermal shrinkage.

A measuring apparatus according to embodiments of the present invention based on the above principles will be described below. In the following embodiments, the measuring apparatus utilizes heat to apply a strain within a workpiece or on a surface of the workpiece. However, a strain may be applied with use of various other means. For example, a sound wave, an ultrasonic wave, or an electromagnetic wave may be used to apply a strain within a workpiece or on a surface of the workpiece. In the following embodiments, the measuring apparatus according to the present invention is incorporated in a polishing apparatus for polishing a surface of a semiconductor substrate. However, the present invention is not limited to use in the polishing apparatus.

Figure 3:
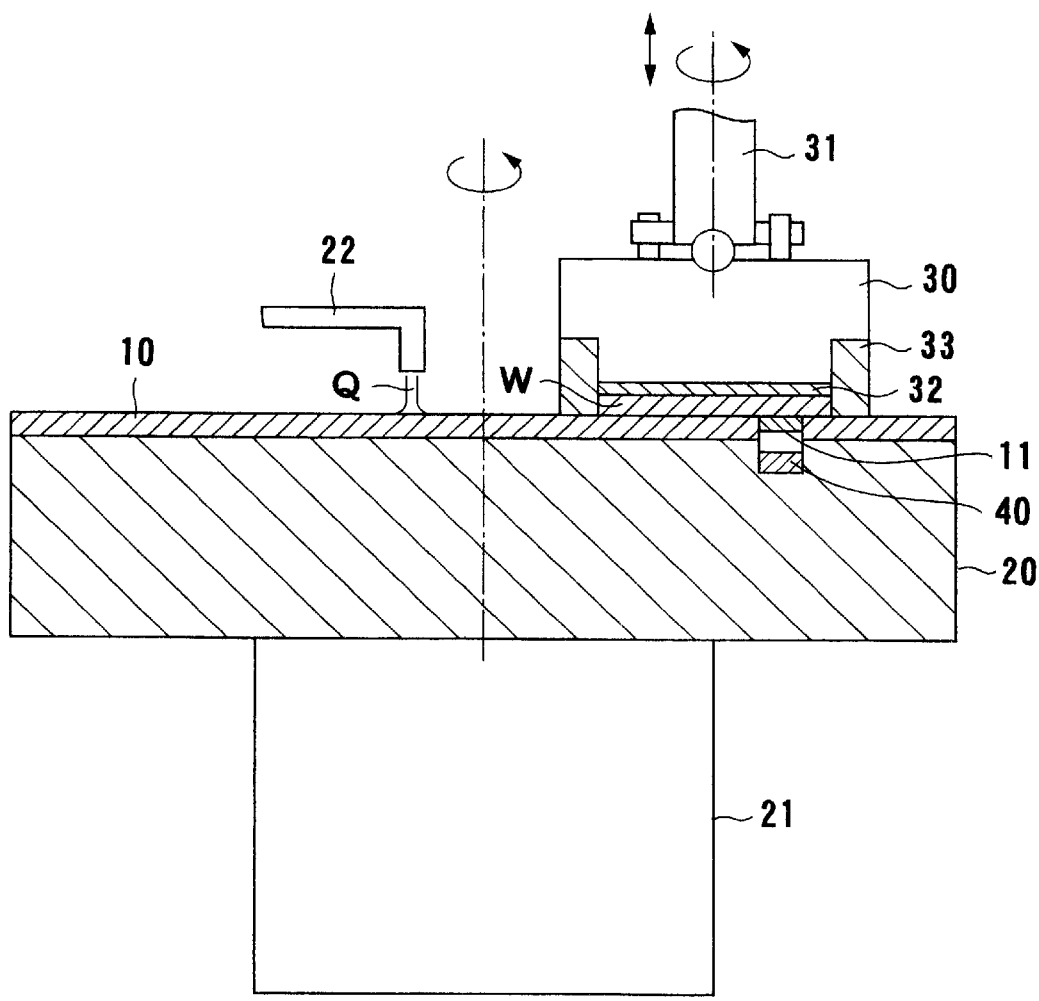
FIG. 3 is a vertical cross-sectional view showing a polishing apparatus incorporating a measuring apparatus according to the present invention.

FIG. 3 is a vertical cross-sectional view showing a whole arrangement of a polishing apparatus incorporating a measuring apparatus according to the present invention. As shown in FIG. 3, the polishing apparatus comprises a polishing table 20 having a polishing pad 10 attached to an upper surface thereof, and a top ring 30 for holding and pressing a semiconductor substrate W as a workpiece to be polished, against an upper surface of the polishing pad 10. The upper surface of the polishing pad 10 serves as a polishing surface held in sliding contact with the semiconductor wafer W as a workpiece to be polished. The polishing surface may be constituted by an upper surface of a fixed abrasive plate comprising abrasive fine particles of $CeO_2$ or the like which are fixed by a binder of resin or the like.

The polishing table 20 is coupled to a motor 21 disposed therebelow, and can be rotated by the motor 21 about its own axis as indicated by the arrow. The polishing apparatus also has a polishing liquid supply nozzle 22 disposed above the polishing table 20 for supplying a polishing liquid Q onto the polishing pad 10.

The top ring 30 is coupled to the lower end of a top ring shaft 31 which is connected to a motor and a lifting/lowering cylinder (not shown). The top ring 30 is vertically movable by the lifting/lowering cylinder and rotatable about its own axis by the motor, as indicated by the arrows. The top ring 30 has, on the lower surface thereof, an elastic pad 32 formed of polyurethane or the like. The semiconductor substrate W to be polished is attracted to and held on the lower surface of the elastic pad 32 under vacuum. While rotating about its own axis, the top ring 30 presses the semiconductor substrate W held on the lower surface of the elastic pad 32 against the polishing pad 10 under a given pressure. The top ring 30 has a cylindrical guide ring 33 at an outer circumferential edge of a lower portion thereof for preventing the semiconductor substrate W from being dislodged from the lower surface of the top ring 30 during the polishing process.

The polishing pad 10 has a light-transmittable member 11 made of a material having a high light transmittance which is fitted into a hole defined in the polishing pad 10, and a measuring apparatus 40 disposed below the light-transmittable member 11 for measuring the thickness of an insulating film or a metal film formed on the polished surface of the semiconductor substrate W to detect when the polishing process is to be finished (i.e., the end point of the polishing process).

Figure 4:
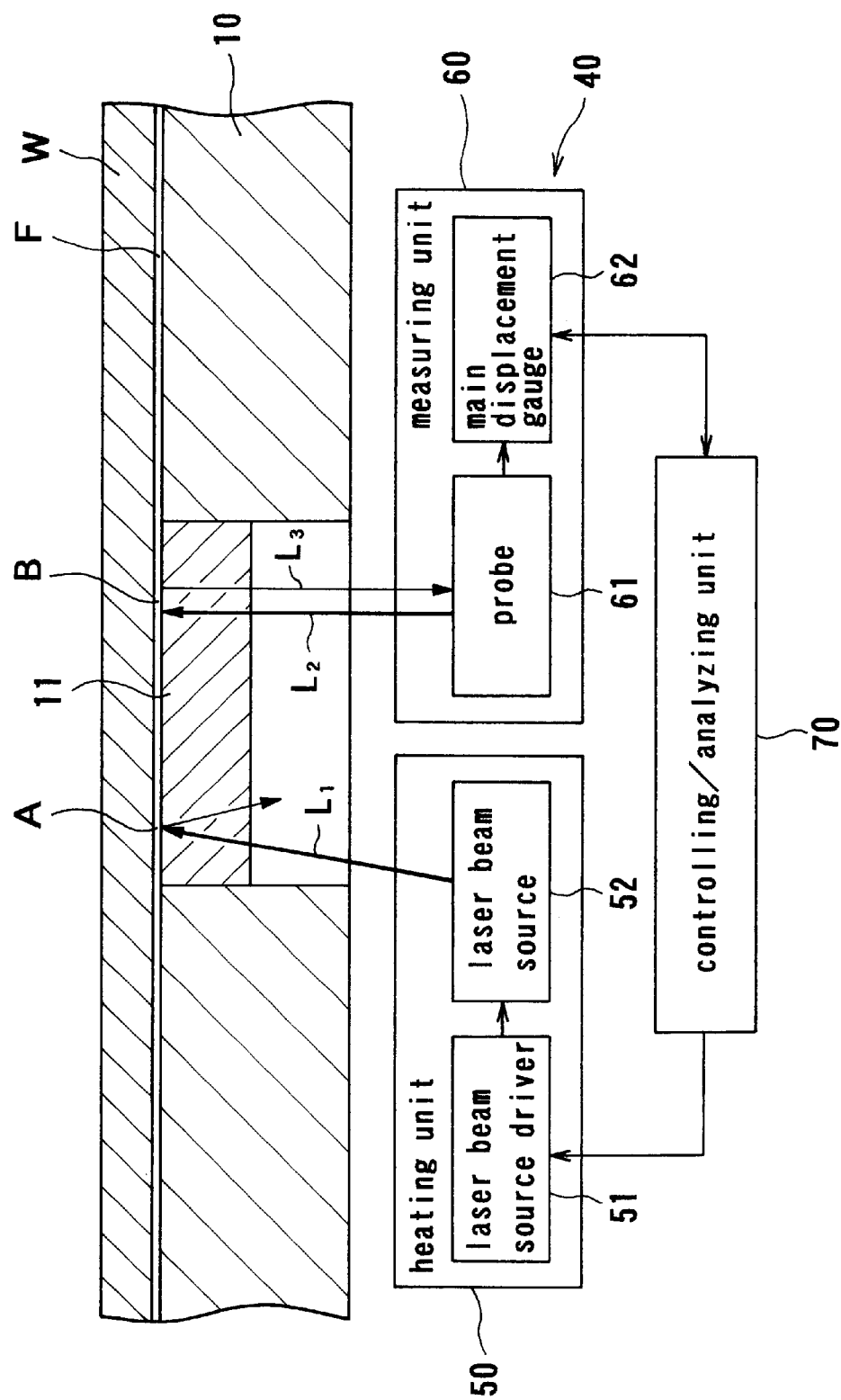
FIG. 4 is a vertical cross-sectional view showing an arrangement of the measuring apparatus shown in FIG. 3.

FIG. 4 is a schematic view showing the arrangement of the measuring apparatus 40. As shown in FIG. 4, the measuring apparatus 40 comprises a heating unit 50 for applying a laser beam (heating light) $L_1$ to the polished surface (thin film F) on the semiconductor substrate W to heat the polished surface, a measuring unit 60 for measuring a displacement of the polished surface of the semiconductor substrate W in the vertical direction (the direction of thickness), and a controlling/analyzing unit 70 for controlling the heating unit 50 and analyzing data measured by the measuring unit 60.

The heating unit 50 comprises a laser beam source 52 having a laser diode therein for applying the laser beam (heating light) $L_1$ to the polished surface of the semiconductor substrate W held by the top ring 30, and a laser beam source driver 51 for supplying a drive current to the laser diode of the laser beam source 52 to cause laser oscillation. The laser beam $L_1$ is applied to a point A on the thin film F formed on the semiconductor substrate W to heat and thermally expand the point A. While a single point of the thin film F may be heated by the laser beam $L_1$, it is preferable to heat a plurality of points on the thin film F. The laser beam $L_1$ for heating may continuously be applied to the thin film F, or may intermittently be applied to the thin film F (i.e., the laser beam $L_1$ may comprise a pulsed or modulated laser beam).

The laser beam $L_1$ has a wavelength determined based on the absorption coefficient of the semiconductor substrate W. The wavelength of the laser beam $L_1$ should preferably be in the range from 630 nm to 1.55 $\mu$m, and more preferably in the range from 800 nm to 810 nm. The spot diameter of the laser beam $L_1$ on the point A should preferably be about 30 $\mu$m. An LED having an increased output capability may be used as a light source for applying a light beam having a wider wavelength range.

The measuring unit 60 comprises an optical heterodyne displacement gauge for measuring a minute displacement with a laser beam (measuring light) $L_2$. Specifically, the measuring unit 60 has a probe 61 and a main displacement gauge 62. The probe 61 applies the laser beam $L_2$ to a measuring point B on the semiconductor substrate W, and receives a laser beam $L_3$ reflected from the measuring point B. A displacement of the thin film F on the semiconductor substrate W is measured based on a phase difference between the applied laser beam $L_2$ and the reflected laser beam $L_3$. In the present embodiment, the optical displacement gauge used as the measuring unit 60 has a measuring resolution of 1 nm and a sampling interval which can be selected in the range from 10 microseconds to 1 millisecond.

The controlling/analyzing unit 70 has a function to control the oscillation of the laser beam $L_1$ in the laser beam source driver 51 of the heating unit 50, and a function to perform a given processing process on a measured signal from the measuring unit 60. The controlling/analyzing unit 70 analyzes the thickness of the thin film F at the point B based on the measured signal from the measuring unit 60, i.e., the displacement of the thin film F at the point B, in consideration of the distance between the points A and B and the properties of the semiconductor substrate W, and detects when the polishing process is to be finished (i.e., the end point of the polishing process) based on the analyzed thickness of the thin film F.

The laser beam $L_2$ emitted from the measuring unit 60 may be frequency-modulated. When the frequency-modulated laser beam $L_2$ is applied to the semiconductor substrate W, a frequency-modulated laser beam $L_3$ is reflected from the thin film F. A high S/N ratio (signal selectivity) can be achieved by extracting an amplitude and a position in synchronism with the modulation frequency from a signal which is produced from the reflected beam $L_3$. Further, information of the semiconductor substrate W along its depth can be obtained by varying the modulation frequency.

According to the present invention, the structure of a workpiece can be measured by a novel process which has not heretofore been available. Particularly, the measuring apparatus according to the present invention can measure the thickness of a metal film of W, Al, Ta, Cu, Ti, or the like, a nitride film of TaN, TiN, SiN, or the like, an oxide film of $SiO_2$ or the like, a film of polycrystalline silicon, a BPSG film, or a plasma TEOS oxide film formed on a semiconductor substrate. The measuring apparatus according to the present invention can also detect an end point of any process in various CMP apparatus for polishing substrates having shallow trenches (STI), interlayer insulating films (ILD, IMD), Cu films, W films, or the like, and various plating apparatus and CVD apparatus for depositing such films on the substrates.

When the measuring apparatus according to the present invention is incorporated in the polishing apparatus, the polished substrate can be measured for film thickness, defects, erosion, and dishing. The measured data can be used to closed-loop control the polishing time for stabilizing the polishing process. The measuring apparatus according to the present invention can measure the film thickness (absolute film thickness) on the semiconductor substrate and changes in the film thickness (relative film thickness) on the semiconductor substrate. Therefore, the accurate (absolute) film thickness on the semiconductor substrate can be measured during a semiconductor fabrication process such as a polishing process. Thus, the semiconductor substrate can be polished while the film thickness is being measured to detect the end point of the polishing process (in-situ measuring process), and hence the total number of processing steps can be made smaller than a conventional process in which the film thickness is measured in such a state that the polishing process is temporarily stopped (ex-situ measuring process).

In the above embodiment, the thickness of a thin film formed on a semiconductor substrate is measured. However, the present invention is not limited to semiconductor substrates, but is also applicable to any workpieces. The measuring apparatus according to the present invention is not limited to the measurement of the thickness of a film, but can be used for a general structural analysis of workpieces.

Figure 6:
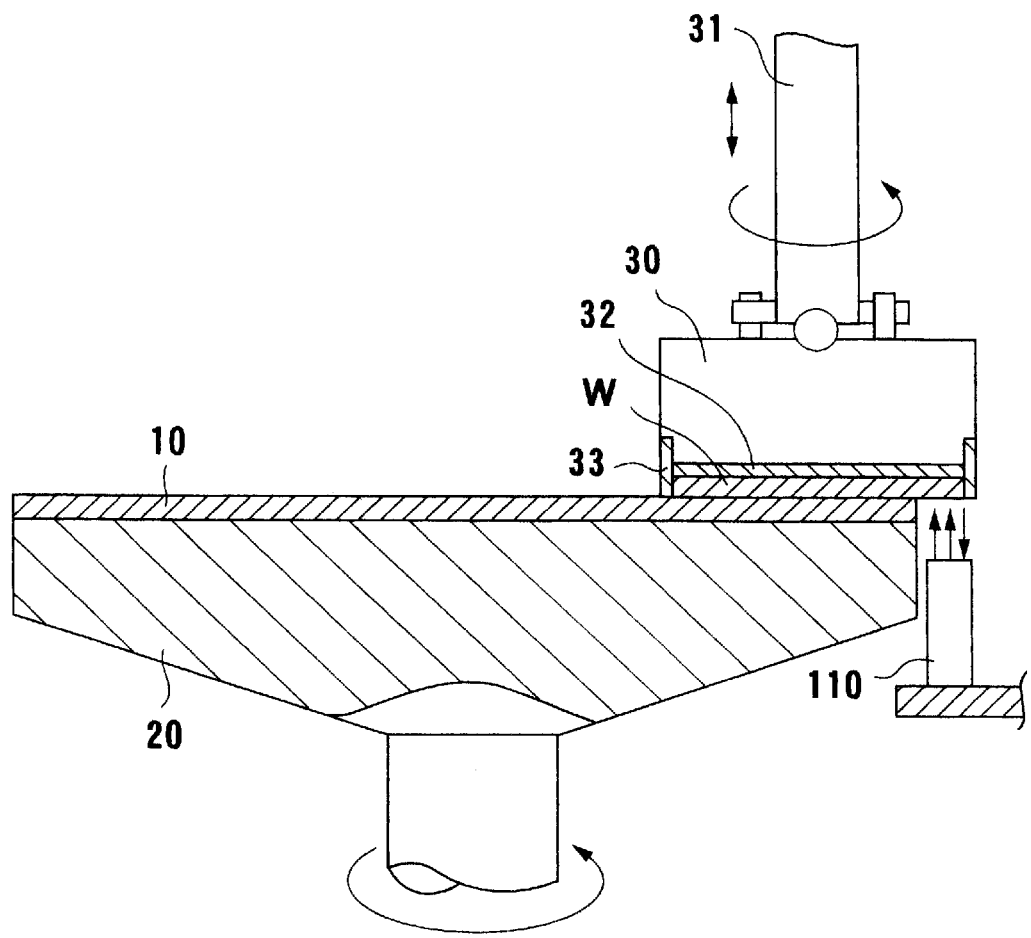
FIG. 6 is a vertical cross-sectional view showing a polishing apparatus incorporating a measuring apparatus according to still another embodiment of the present invention.

In the above embodiment, the measuring apparatus 40 is disposed below the polishing pad 10. However, the arrangement of the measuring apparatus is not limited thereto. FIG. 5 shows another example where a measuring apparatus 100 is embedded in the top ring 30. The measuring apparatus 100 applies a heating light and a measuring light to the reverse side of a semiconductor substrate W. FIG. 6 shows still another example where a measuring apparatus 110 is disposed outside of the polishing table 20. For measuring a film thickness, a semiconductor substrate W held by the top ring 30 is positioned so as to partially project outwardly from the outer circumferential edge of the polishing table 20. The measuring apparatus 110 applies a heating light and a measuring light to the exposed portion of the polished surface of the semiconductor substrate W in such a state that the polished surface of the semiconductor substrate W is thus partially exposed out of the outer circumferential edge of the polishing table 20.

Figure 7:
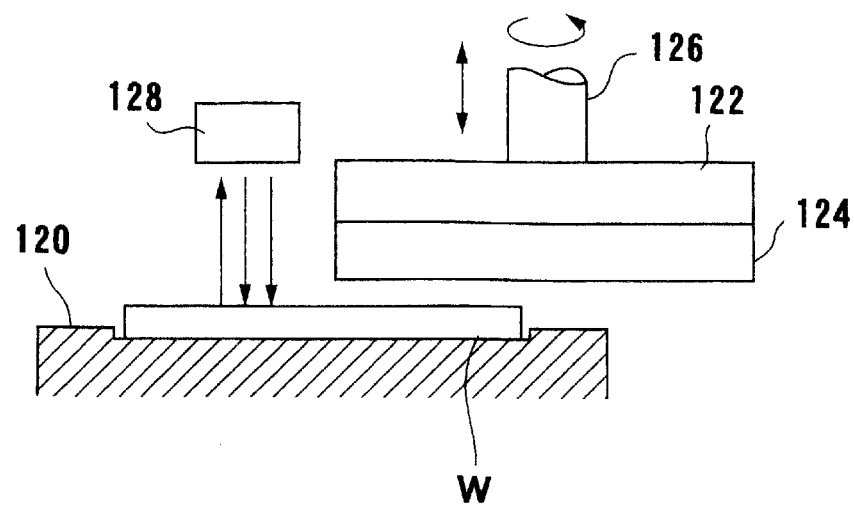
FIG. 7 is a vertical cross-sectional view showing a polishing apparatus incorporating a measuring apparatus according to still another embodiment of the present invention.

FIG. 7 is a schematic view showing a polishing apparatus incorporating a measuring apparatus according to another embodiment of the present invention. In the polishing apparatus shown in FIG. 7, a semiconductor substrate W is held on a substrate holder 120 in such a state that the polished surface of the semiconductor substrate W faces upwardly. A holder 122 is positioned above the semiconductor substrate W, and a polishing pad 124 is attached to the lower surface of the holder 122. The lower surface of the polishing pad 124 is held in sliding contact with the upper surface of the semiconductor substrate W to polish the upper surface of the semiconductor substrate W. Specifically, the holder 122 presses the polishing pad 124 against the upper surface of the semiconductor substrate W, and is simultaneously rotated about its shaft 126 and is also translated or revolved in a plane perpendicular to the shaft 126, for thereby polishing the entire surface of the semiconductor substrate W. A measuring apparatus 128 according to the present invention is disposed above the semiconductor substrate W, and applies a heating light and a measuring light to the upper polished surface of the semiconductor substrate W.

The measuring apparatus according to the present invention may be incorporated in a buffing apparatus for buffing a substrate. In such a case, the measuring apparatus introduces a heating light and a measuring light into the buffing apparatus through an optical fiber to apply the heating light and the measuring light to the substrate which is being buffed.

In each of the above measuring apparatuses, the heating light and/or the measuring light may be applied to the substrate while the heating light and/or the measuring light is being moved as needed.

In the above embodiments, an optical heterodyne displacement gauge is used as a measuring unit for measuring a displacement of the surface of a substrate. However, any of various other displacement gauges may be used as a measuring unit. While a displacement caused by the propagation of heat is measured in the above embodiments, a thermoelastic wave may be measured with a piezoelectric element, or an acoustic wave or a light wave such as infrared radiation may be measured. Measured results from a plurality of measured entities may be combined with each other to enhance the accuracy of the measurement.

In the above embodiments, heat is used to apply a strain to a surface of a workpiece. However, a strain may be applied to a surface of a workpiece with use of a sound wave, an ultrasonic wave, or an electromagnetic wave.

When a strain is applied to a point within a workpiece, an internal structure of the workpiece can be analyzed based on the strain applied to the point within the workpiece. For example, in the case where interconnections are provided in a plurality of layers on a semiconductor substrate, an electromagnetic wave may be applied to a selected one of the layers to apply a strain to that one of the layers, for selectively analyzing the structure of that layer.

Although certain preferred embodiments of the present invention have been shown and described in detail, it should be understood that various changes and modifications may be made therein without departing from the scope of the appended claims.

What is claimed is:

1. A measuring apparatus comprising:
   a heating unit for applying a frequency-modulated laser beam to apply heat to a first point within a workpiece or on a surface of a workpiece and propagating the heat to a second point within the workpiece or on the surface of the workpiece;
   a measuring unit for measuring a displacement of the surface of the workpiece at said second point to which said heat has been propagated; and
   an analyzing unit for analyzing a structure of said workpiece based on the displacement measured by said measuring unit in consideration of a distance between said first point and said second point.

2. A measuring apparatus according to claim 1, wherein said measuring unit measure a reflected laser beam which is reflected from the workpiece,
   wherein said analyzing unit is configured to extract an amplitude in synchronism with a modulated frequency of the frequency-modulated laser beam from the reflected laser beam.

3. A measuring apparatus according to claim 1, wherein the frequency-modulated laser beam is varied in modulation frequency,
   wherein said analyzing unit outputs information of the workpiece along its depth.

4. A measuring apparatus comprising:
   a strain applying unit for applying a frequency-modulated wave to apply a strain to a first point within a workpiece or on a surface of a workpiece and propagating the strain to a second point within the workpiece or on the surface of the workpiece;
   a measuring unit for measuring a displacement of the surface of the workpiece at said second point to which said strain has been propagated; and
   an analyzing unit for analyzing a structure of said workpiece based on the displacement measured by said measuring unit in consideration of a distance between said first point and said second point.

5. A measuring apparatus according to claim 4, wherein said strain applying unit utilizes a sound wave to apply the strain to said first point.

6. A measuring apparatus according to claim 4, wherein said strain applying unit utilizes an ultrasonic wave to apply the strain to said first point.

7. A measuring apparatus according to claim 4, wherein said strain applying unit utilizes an electromagnetic wave to apply the strain to said first point.

8. A measuring apparatus according to claim 4, wherein said measuring unit measures a reflected wave which is reflected from the workpiece, wherein said analyzing unit is configured to extract an amplitude in synchronism with a modulation frequency of the frequency-modulated wave from the reflected wave.

9. A measuring apparatus according to claim 4, wherein the frequency-modulated wave is varied in modulation frequency, wherein said analyzing unit outputs information of the workpiece along its depth.

10. A polishing apparatus comprising:

a polishing table having a polishing surface;

a top ring for holding and pressing a workpiece to be polished against said polishing surface; and a measuring apparatus for measuring the thickness of a film formed on a surface of the workpiece, said measuring apparatus comprising:

a heating unit for applying a frequency-modulated laser beam to apply heat to a first point within the workpiece or on the surface of the workpiece and propagating the heat to a second point within the workpiece or on the surface of the workpiece;

a measuring unit for measuring a displacement of the surface of the workpiece at said second point to which said heat has been propagated; and an analyzing unit for analyzing a structure of said workpiece based on the displacement measured by said measuring unit in consideration of a distance between said first point and said second point.

11. A polishing apparatus according to claim 10, wherein said measuring unit measures a reflected laser beam which is reflected from the workpiece, wherein said analyzing unit is configured to extract an amplitude in synchronism with a modulation frequency of the frequency-modulated laser beam from the reflected laser beam.

12. A polishing apparatus according to claim 10, wherein the frequency-modulated laser beam is varied in modulation frequency, wherein said analyzing unit outputs information of the workpiece along its depth.

13. A polishing apparatus comprising:

a polishing table having a polishing surface;

a top ring for holding and pressing a workpiece to be polished against said polishing surface; and a measuring apparatus for measuring the thickness of a film formed on a surface of the workpiece, said measuring apparatus comprising:

a strain applying unit for applying a frequency-modulated wave to apply a strain to a first point within the workpiece or on the surface of the workpiece and propagating the strain to a second point within the workpiece or on the surface of the workpiece;

a measuring unit for measuring a displacement of the surface of the workpiece at said second point to which said strain has been propagated; and an analyzing unit for analyzing a structure of said workpiece based on the displacement measured by said measuring unit in consideration of a distance between said first point and said second point.

14. A polishing apparatus according to claim 13, wherein said strain applying unit utilizes a sound wave to apply the strain to said first point.

15. A polishing apparatus according to claim 13, wherein said strain applying unit utilizes an ultrasonic wave to apply the strain to said first point.

16. A polishing apparatus according to claim 13, wherein said strain applying unit utilizes an electromagnetic wave to apply the strain to said first point.

17. A polishing apparatus according to claim 13, wherein said measuring unit measures a reflected wave which is reflected from the workpiece, wherein said analyzing unit is configured to extract an amplitude in synchronism with a modulation frequency of the frequency-modulated wave from the reflected wave.

18. A polishing apparatus according to claim 13, wherein the frequency-modulated wave is varied in modulation frequency, wherein said analyzing unit outputs information of the workpiece along its depth.

* * * * *